Sept. 17, 1935.  E. PAPPERT  2,014,978

LENS STRAP

Filed Aug. 11, 1933

Inventor
Emanuel Pappert
By Geo. P. Kimmel
Attorney

Patented Sept. 17, 1935

2,014,978

UNITED STATES PATENT OFFICE 2,014,978

LENS STRAP

Emanuel Pappert, Flushing, N. Y., assignor to The Ful-Vue Sales Company, Washington, D. C.

Application August 11, 1933, Serial No. 684,737

4 Claims. (Cl. 88—47)

This invention relates in general to spectacles and more particularly has reference to a lens strap adapted for use in rimless spectacle mountings.

In the past, lens straps used in rimless mountings have consisted essentially of a lens edge engaging portion for the purpose of engaging the edge of the lens, and of a pair of strap ears extending inwardly on opposite faces of the lens from substantially the central portion of the edge engaging part. It will readily be seen that in a structure of this sort it was very difficult if not altogether impossible to adjust or change the distance between the edge engaging portion of the lens strap and the inner end of the strap ears, but that this distance was fixed and no resiliency of the various parts would enable the securing means which is customarily placed adjacent the inner ends of the strap ears to hold the edge engaging portion resiliently against the edge of the lens. It is an object of this invention to provide a lens strap which may be positioned at any desired point along the edge of a lens, in which the distance from the edge engaging portion to the inner ends of the strap ears where they are secured to the lenses may be adjusted, and in which the strap ears are so formed as to be capable of resiliently holding the edge engaging portion of the strap in contact with the edge of the lens.

It is a further object to provide a lens strap which will resist any torsional stress that may be placed on the lens support and will tend to distribute this torsional stress in a manner least likely to cause fracture of the lens.

With the above and other objects in view this invention consists in general of the parts and combinations of the type illustrated in the accompanying drawing and set forth in the following description. It will be understood that the said drawing and description are by way of illustration and example only and are not to be taken as limiting the scope of this invention. With reference to the drawing in which like numerals indicate corresponding parts throughout:

Figure 1:
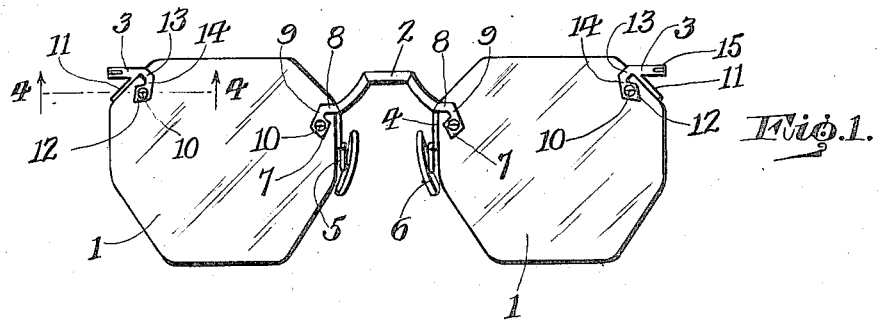
Figure 1 is a front view of a spectacle constructed in accordance with this invention.

In accordance with this invention, the spectacle illustrated in the drawing consists of a pair of lenses 1 connected by a bridge member 2 and having on their temporal edges a pair of endpieces 3. The bridge 2 is provided with a pair of downwardly extending arms 4 adapted to engage the edges of the lenses below the ends of the bridge, and form the edge engaging portions of the lens straps. To the lower ends of these downwardly extending edge engaging portions there are secured a pair of rearwardly extending looped nose pad supporting arms 5 carrying nose pads 6 which are of conventional construction.

At the upper ends of the edge engaging portions 4 and extending inwardly along the opposite faces of the respective lenses 1 are lens strap ears 7 having portions 8 which form continuations of the ends of the bridge 2 and are disposed substantially at right angles to the edge engaging portions 4. At the ends of these portions 8 the strap ears extend downwardly at 9, terminating at points substantially opposite the central portions of the lens edge engaging members 4. For the purpose of securing these strap ears to the lenses there is illustrated a screw 10 which extends through one strap ear and the lens and is threaded into the other strap ear.

The lens strap at the temporal side of the lens is very similar to that used in connection with the bridge. The edge engaging portion 11 of this lens strap extends along the inclined upper and outer portion of the lens edge so as to position the endpiece 3 above the normal useful field of side vision and above the lines of centers of the pupils of the eyes when the spectacles are in normal position. This lens strap is likewise provided with strap ears 12 which extend from the opposite edges of the edge engaging portion 11 at the upper end thereof in a direction substantially perpendicular to said edge engaging portion as illustrated at 13. These ears are then extended downwardly in a direction substantially parallel to the edge engaging portion 11 as indicated by the numeral 14, and terminate at a position opposite the central portion of the lens edge engaging portion. It will be seen that this terminal point both in the case of the endpiece and in the case of the bridge is substantially on the perpendicular bisector of the lens edge engaging part. A screw 10 is employed the same as in the case of the bridge connection and in the same manner.

Figure 2:
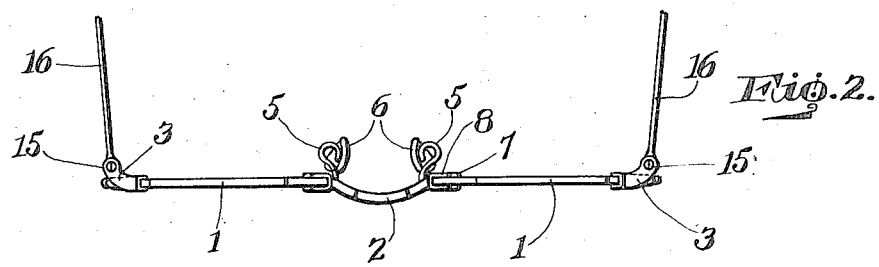
Figure 2 is a plan view of the construction illustrated in Figure 1.
Figure 3:
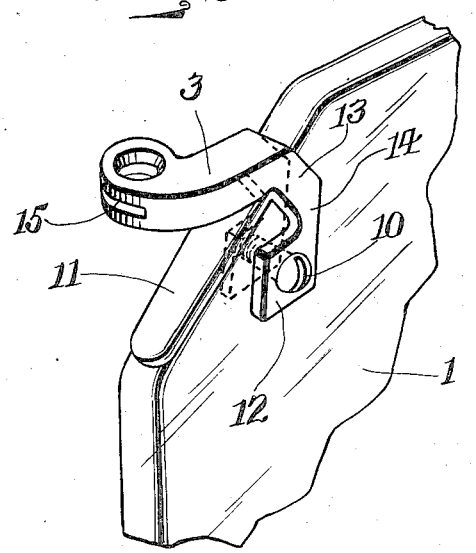
Figure 3 is a perspective view illustrating one of the endpieces shown in Figures 1 and 2, the same being secured in place on a lens.
Figure 4:
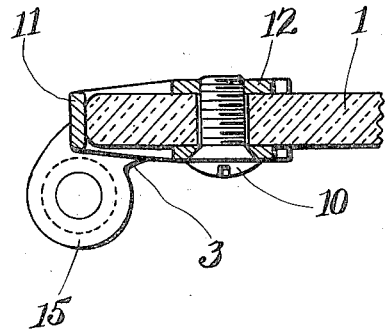
Figure 4 is a sectional view taken along the line 4—4 of Figure 1.

The endpieces 3 are curved towards the rear as illustrated in Figures 2 and 3 and are provided with hinge connections 15 at their ends adapted to receive the customary temple members 16.

From the above description it will be apparent that any torsional force on the bridge caused by the bearing of the nose pads 6 against the nose will be taken up over a considerable portion of the lens because of the fact that the lens strap has a part 8 and a part 9 which extend inwardly and downwardly respectively and serve to distribute any such torsional stress. The same will be true of the endpiece straps in which the portions 13 and 14 correspond to the portions 8 and 9 respectively.

In addition, it is pointed out that the lens strap ears are made of a pliable resilient material so that they may be adjusted to position the ends thereof closer to or farther away from the edge engaging portion depending upon the conditions of any particular case. At the same time, they may be so shaped that when the screw 10 or other securing means is put in position the strap ears will be under a slight tension which will urge the lens edge engaging portion resiliently against the edge of the lens.

Along with its other advantages, the lens strap illustrated in this drawing is ornamental in that the lens supports which consist of the bridge 2 and the endpieces 3 are disposed in alignment with the portions 8 and 13 of the lens straps respectively so that one will form a continuation of the other the same as in the previous rigid type of lens straps. The construction set forth clearly attains all the objects of this invention in a novel, efficient and desirable manner.

I claim:—

1. In a lens strap for a rimless spectacle, an edge engaging portion adapted to engage the edge of a lens, and a pair of strap ears adapted to engage the opposite faces of the lens, said strap ears extending from the opposite edges of said edge engaging portion at the upper end thereof and each having a part extending inwardly from the edge engaging portion and a part extending downwardly from the inner end of said first part and terminating at a position opposite an intermediate part of the edge engaging portion, and means adjacent the lower end of said downwardly extending part for securing the lens strap to the lens, said lens strap ears being formed of pliable resilient material whereby they may be adjusted to position the securing means at the proper distance from the edge of the lens and hold the edge engaging portion resiliently against the edge of the lens.

2. In a lens strap for a rimless spectacle, an edge engaging portion adapted to engage the edge of the lens, and a pair of ears adapted to engage the opposite faces of the lens, said ears extending from the opposite edges of said edge engaging portion at one end thereof and each having a part extending inwardly from the edge engaging portion substantially at right angles thereto, and a part extending substantially parallel to said edge engaging portion and terminating at a position opposite an intermediate part thereof, and means adjacent the end of said parallel part for securing the lens strap to the lens.

3. In a lens strap for a rimless spectacle, an edge engaging portion adapted to engage the edge of the lens, and a pair of ears adapted to engage the opposite faces of the lens, said ears extending from the opposite edges of said edge engaging portion at one end thereof and each having a part extending inwardly from the edge engaging portion substantially at right angles thereto, and a part extending substantially parallel to said edge engaging portion and terminating at a position opposite the center of said edge engaging portion, means adjacent the end of said parallel part for securing the said ears to the lens, and a lens support secured to said edge engaging portion at the same end thereof to which said ears are secured, whereby said lens support and said ears will form continuations of each other.

4. A lens strap for rimless spectacles comprising a one-piece body having a lens edge abutting portion and a pair of parallel spaced ears for abutting the faces of the lenses and disposed in depending relation with respect to said portion, each of said ears including an inwardly extending downwardly inclined upper part and a vertically disposed lower part of greater width than said upper part, said lower part being offset in an outward direction with respect to the outer side edge of said upper part, said lower parts being formed with aligning openings for the passage of fasteners to anchor the strap to the lens, and said upper parts at their upper ends merging into said portion.

EMANUEL PAPPERT.